June 15, 1948. P. LEO 2,443,257
CUTTING TOOL
Filed May 16, 1945
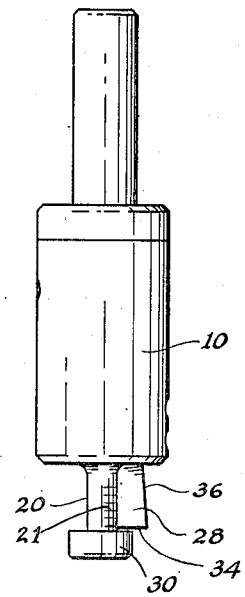
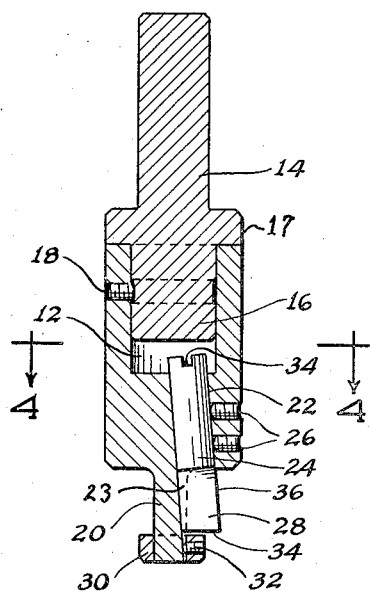
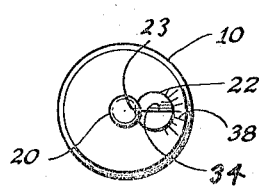
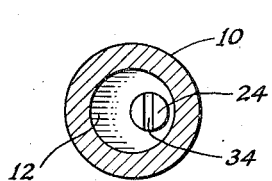
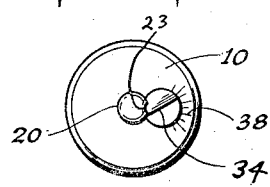
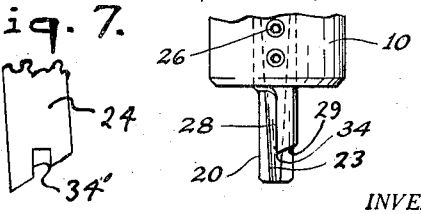
INVENTOR.
Paul Leo
BY
John M. Leach
ATTORNEY.

Patented June 15, 1948

2,443,257

UNITED STATES PATENT OFFICE 2,443,257

CUTTING TOOL

Paul Leo, New York, N. Y., assignor of ten one-hundredths to John M. Leach, Port Washington, N. Y.

Application May 16, 1945, Serial No. 594,005

1 Claim. (Cl. 77—58)

The present invention relates to cutting implements. More particularly, it relates to a cutting tool particularly adapted as a counter bore or countersink.

Cutting tools of the type heretofore used for counter boring openings have been complicated in nature and have generally consisted of a tool having a plurality of integral cutting edges or cutting faces extending radially from a central body. This type of structure has necessitated extreme care in sharpening, both originally and after use, to make certain that each of the cutting edges extends the same distance from the central axis of the main body and extends the same distance measured along the axis of the main body. Very few workmen have the skill required to sharpen such a cutting tool by hand, which has necessitated the use of expensive, precision grinding equipment of the type seldom found in smaller shops and departments in order to properly sharpen such tools. Furthermore, tools of this type can be sharpened only a few times before they become so diminished in size, due to the back relief or clearance, as to become incapable of use to counter bore an opening of the same dimensions as the tool was originally designed to produce. This has been uneconomical because counter boring tools of such type have been expensive in regard to original purchase and because of their relatively short life have been expensive to replace.

Furthermore, the breakage of one of the cutting edges of counter boring tools of the prior art frequently incapacitates the entire tool because there is a tendency for chips to collect at the breakage point and cause a jamming action which throws excessive stress on the other cutting edges which results in their breakage.

It is an object of the present invention to provide a cutting tool capable of use as a counter bore which overcomes all of the foregoing deficiencies of prior art structures.

It is another object of the present invention to provide a cutting tool capable of use as a counter bore which can be originally sharpened and resharpened by a relatively unskilled workman.

It is another object of the present invention to provide a cutting tool of the type of a counter bore which has only one cutting edge of a simple nature.

It is a further object of the present invention to provide a cutting tool capable of use as a counter bore which is adjustable so as to cut openings of different sizes over a substantial range of sizes.

It is a still further object of the present invention to provide a cutting tool capable of use as a counter bore in which all wearing parts can be rapidly and economically replaced by a person of a relatively unskilled character.

It is a still further object of the present invention to provide a process of manufacturing a cutting tool capable of use as a counter bore in a rapid and economical manner.

Other objects and advantages of the present invention, if not particularly pointed out, will be apparent to those skilled in the art upon recourse to the following detailed description of what is now considered to be the preferred form of the invention.

The invention accordingly comprises the several steps and the relation of one or more of such steps with respect to each of the others and the article possessing the features, properties and the relation of elements which are exemplified in the following detailed disclosure and the scope of the invention will be indicated in the claim.

For a more detailed description of the invention, reference should be had to the following specification taken in connection with the accompanying drawings, throughout which like reference characters refer to like parts, and in which:

Fig. 1 is an elevational view of the cutting tool of the present invention;

Fig. 2 is a vertical, elevational, central, cross-sectional view of the cutting tool of Fig. 1;

Fig. 3 is a bottom plan view of the cutting tool of Fig. 1 with the sleeve element 30 removed in order to more clearly disclose certain features of the invention;

Fig. 4 is a horizontal, cross-sectional view taken substantially on the plane indicated by line 4—4 of Fig. 2 and looking in the direction of the arrows;

Fig. 5 is a bottom plan view of the cutting tool illustrated in Fig. 1 with the sleeve element 30 removed to better illustrate certain features of the invention;

Fig. 6 is a fragmentary, side, elevational view looking at the right side of the cutting tool illustrated in Fig. 1, and Fig. 7 is a fragmentary view of a blade of the tool of the present invention on an enlarged scale to more clearly show its features.

The cutting tool comprising the article of the present invention comprises a body 10 which is substantially cylindrical in shape as shown but may be of other desired shapes, and is provided with a cavity 12 as illustrated in Fig. 2. A shank 14 is provided with a boss 16 which fits snugly within the cavity 12 and is held in place therein by a set screw 18 or other desired fastening. The shank 14 is also provided with a flange 17 which fits snugly on top of the body 10 as illustrated in Fig. 2. The shank 14 is thus removable and may be replaced by other shanks having taper, square, triangular or other desired shapes to permit insertion of the tool in any suitable machine such as a drill press, lathe or the like. If desired, the body 10 may be received directly by the chuck or other holding device when the outer diameter of the body 10 does not exceed the capacity of the holding device.

The body 10 is provided with a pilot 20 which is of such size as to be snugly received directly within a primary opening or hole to be counter bored and the pilot may include a removable collar 30 which has an external diameter of such dimension as to fit snugly within the primary opening when such opening is larger than the pilot 20. The collar 30 is suitably fastened to the pilot 20 as by the use of a set screw 32 and with the pilot 20 forms a pilot adjustable as to size. To this end the collar 30 may be replaced by collars of different sizes so as to adapt the tool for use in connection with primary openings of various sizes.

The body 10 is provided with an opening 22 extending vertically thereof in the plane of the axis of the body 10 and inclined outwardly at an angle to the axis of the body 10 and pilot 20 as illustrated in Fig. 2. The extension of the opening 22 into the pilot 20 provides an open face groove 23 which extends along the pilot. A cutting tool 24 which is preferably substantially cylindrical in shape is received within the opening 22 and is received in the groove 23 so that the pilot and cutting tool provide mutual support. The cutting tool is provided with a ground face 28 on one side and a ground face 29 on the bottom, which faces form a cutting edge 34 ground so as to extend radially of and at a right angle to the axis of the body 10 in this embodiment of the invention. The cutting blade 24 is held in position in the opening 22 as, for example, by a pair of set screws 26 and is provided with a screw driver slot 34 in the upper end thereof.

The process of manufacturing the cutting tool of the present invention comprises suitably cutting a cylindrical blank 10 to form the openings 12 and 22 and then cutting away the metal at the lower end of the body 10 to simultaneously form the pilot 20 and the groove 23. In this manner the accuracy of registration of the opening of the groove is assured.

In setting up the tool originally the cutting blade 24 is suitably ground as illustrated and is placed within the opening 22 and extended along the pilot 20 to any desired extent as indicated by the index marks 21 illustrated in Fig. 1. In view of the fact that the axis of the cutting blade 24 is at an angle to the axis of the body 10, the farther the cutting blade 24 is lowered in the groove 23 the greater the effective diameter of the cutting edge 34 of the blade. The indices 21 are of selected distance apart on the pilot 20 so that, for example, each one will position the cutting blade 24 to cut an opening 1/1000 of an inch, plus or minus, larger than the index immediately above it. After the cutting blade 24 has been thus approximately positioned in the opening 22, one of the set screws 26 is lightly screwed into contact with it and a screw driver is inserted in the slot 34 and the cutting edge 34 is rotated slightly to cause the distance of the outer tip of the cutting blade from the central axis of the pilot 20 to exactly equal the radius of the opening desired to be cut by the counter bore. This arises because rotation of the cutting edge 34 from the position illustrated in Fig. 3 to a position such as that illustrated in Fig. 5 reduces the effective diameter of the cutting edge and thereby enables the cutting blade to be very accurately adjusted to cause the tool to cut the proper size opening. Also, the effective rake of the tool may be changed in this manner to accommodate different materials and at the same time retain the desired size of opening. It is even possible to quickly change from a positive to a negative or a neutral rake.

The bottom of the body 10 is preferably graduated circumferentially of the opening 22 and provided with index marks 38 which register with the cutting edge 34 and indicate the amount of rotation of the cutting blade 24. This makes it possible to reset the cutting tool subsequent to sharpening of the edge 34 so as to produce exactly the same diameter cut formerly produced by the tool. Also, the graduations 38 may be selected so as to cause rotation of the cutting blade 24 to change the effective diameter of the cutting edge 34 a desired amount, for example, 5/10000 of an inch.

The adjustability of the cutting blade 24 makes it possible to utilize one cutting tool to cut openings varying, for example, by 1/1000 of an inch over a wide range, for example, a 32nd of an inch. The range variation of a cutting tool may be controlled by the size of the angle between the axis of the cutting blade 24 and the axis of the body 10. The greater this angle, the larger the effective range of cutting sizes obtainable on one cutting tool.

The cutting blade 24 may be resharpened without disturbing a machine set-up by merely removing the cutting blade 24 and the pilot sleeve 30, providing one is being used at the time, and the blade 34 is sharpened by grinding the single face 28. This can be done on an ordinary grind stone, emery wheel or other suitable grinder or stoned by a relatively unskilled mechanic. The cutting tool is thereafter reassembled as previously described and can be rapidly reset by a relatively unskilled mechanic to cut exactly the same size hole for which it was originally adjusted to cut.

During the cutting operation the edge 36 on the cutting blade 24 automatically provides clearance due to the fact that it recedes upwardly which makes for the production of smooth side walls in the counter bore opening and long life of the cutting tool due to low friction and slight generation of heat even at high cutting speeds.

The cutting blade 24 may be selected as to composition in accordance with the type of material to be cut, which makes it possible to use the cutting tool of the present invention to cut substantially any desired material.

The single face cutting blade provides much greater chip clearance than a multi-blade cutting tool, which makes it possible to cut longer before withdrawing the tool to clear away chips. This reduces time loss and decreases labor costs. When the cutting blade 24 is finally consumed by resharpening operations, it may be replaced at a low cost. In fact, the only wearing parts on the cutting tool are the blade 24 and the sleeve 30.

These may be replaced at relatively low cost which makes for long and accurate life of the entire cutting tool. Furthermore, since only the wearing parts need be hardened the other parts of the tool may be made from relatively inexpensive material.

The cutting tool of the present invention is remarkably smooth in performance and free from chatter even at high cutting speeds.

The cutting tool of the present invention may be changed from a clockwise to a counterclockwise cutter by merely rotating the cutting blade 24 through an arc of 180 degrees, plus or minus, and setting it in the adjusted position.

In the event it is desired to reduce the effective diameter of the opening cut by the blade 24 without taking time to disassemble the tool, a slight grind at the outer end of the cutting edge 34 will effectively reduce the diameter of the opening cut by the blade 24 to any extent desired.

The single cutting blade requires less operating power than multi-blade tools and enables cutting blade replacements to be made rapidly with resulting saving in time.

If desired the cutting edge 34 may be positioned at substantially any desired angle to the central axis of the tool 10 to enable the bottom of the opening cut by the blade 24 to be at an angle instead of horizontal to thereby perform the type of counter boring normally known as countersinking. Also, it is obvious that many different designs may be ground into the blade 34 to produce substantially any desired shape at the bottom of the counter bore. One of the many forms which the cutting edge of the blade may have is shown at 34' in Fig. 7. The advantages of the tool of the present invention are of particular merit when a blade shape such as that shown at 34' is used, because the single blade eliminates the necessity for the tool grinder to perform the nearly impossible feat of grinding three or more cutting edges so that they will track, as was required in prior art cutting tools.

Since certain changes in carrying out the above process and certain modifications in the invention may be made without departing from its scope, it is intended that all matter contained in the above description or shown in the accompanying drawings shall be interpreted as illustrative and not in a limiting sense.

The invention having been described, what is claimed is:

A cutting instrument comprising an elongated pilot for reception and guidance by a primary opening, the pilot having an open sided groove therein extending longitudinally of and in the plane of the central axis of the pilot and inclined outwardly at an acute angle to said axis, an elongated cutting tool disposed in said groove and having a cutting edge, and releasable means holding the pilot and cutting tool in stationary engagement, the angle between the groove and central axis of the pilot being such that the said cutting tool extends a substantial distance along the pilot in the groove to cause the pilot and cutting tool to provide mutual support and mutual stiffening.

PAUL LEO.

REFERENCES CITED

The following references are of record in the file of this patent:

UNITED STATES PATENTS

| Number | Name | Date |
|---|---|---|
| 1,174,460 | Wirz | Mar. 7, 1916 |
| 1,240,701 | Geitner | Sept. 18, 1947 |
| 1,479,488 | Zidakovits | Jan. 1, 1924 |
| 1,628,684 | Pleister | May 17, 1927 |
| 1,724,005 | Christensen | Aug. 13, 1929 |

OTHER REFERENCES

American Machinist, page 1082, June 26, 1913, 77–58.2. (Copy on file in Div. 47.)